United States Patent [19]

Schneider et al.

[11] 4,401,847

[45] Aug. 30, 1983

[54] TELEPHONE COMMUNICATION SYSTEM

[75] Inventors: Alan A. Schneider, Reisterstown; Ronald J. Flower, Hampstead; George C. Bowser, Reisterstown, all of Md.; Lewis C. Kenyon, Worchester, Mass.

[73] Assignee: Catalyst Research Corporation, Baltimore, Md.

[21] Appl. No.: 173,622

[22] Filed: Jul. 30, 1980

[51] Int. Cl.³ .............................................. H04M 9/06
[52] U.S. Cl. ..................................... 179/1 H; 179/37
[58] Field of Search ................... 179/1 R, 1 H, 1 CN, 179/18 BF, 18 BC, 37, 38, 39, 40, 99 A, 99 P

[56] References Cited

U.S. PATENT DOCUMENTS 4,188,511 2/1980 Smith et al. ........................... 179/37

OTHER PUBLICATIONS

Sadachi et al., "Distributed Switch Intercom System", National Technical Report, vol. 26, No. 1, Feb. 1980, pp. 13-20.

Primary Examiner—Joseph A. Popek
Attorney, Agent, or Firm—Thomas H. Murray

[57] ABSTRACT

A multi-wire telephone system which facilitates voice and data communication between any two telephones connected to each other with one of a plurality of standard shielded twisted-pair cables. The telephones, which are battery-powered, feature standard telephone operation without a central switching and control station or PBX. Each telephone is provided with a microprocessor which can generate and decode all signals necessary to establish communication with any other telephone in the system. Since a PBX is not required, a break in any phone line will result in two systems operating independently of each other although somewhat degraded performance can be expected, depending upon the nature of the break. Whenever communication is established between two stations in the system, a direct current bias is impressed on the cable interconnecting those stations such that all other stations in the system can determine that that particular cable is in use and can select another cable for communication. Communication is initially established between stations with the use of frequency shift keyed signals sent from one station and retransmitted from the called station before voice communication is established. The telephone system has both private and page communication capabilities and can transmit data in the form of pulsed signals as well as voice signals. The system incorporates a main dispatcher station which can interrupt any private communication in emergency situations and for data transmission.

19 Claims, 3 Drawing Figures

TELEPHONE COMMUNICATION SYSTEM

BACKGROUND OF THE INVENTION

While not limited thereto, the present invention is particularly adapted for use as a telephone communication system for underground mines and the like. In such communication systems, there must be capability for private conversations between any two stations in the system. In addition, general paging must be provided whereby a voice message from one station is broadcast from a loud-speaker at every other station in the system. It is also desirable to provide for data transfer derived, for example, from monitoring devices which produce signals indicating an off-normal condition such as a fire at a particular location within the mine. Telephone systems of this type are battery-operated; and provision must be made to conserve battery power by connecting the battery to the circuitry at a station in the system only when it is transmitting or receiving a signal.

SUMMARY OF THE INVENTION

In accordance with the present invention, a new and improved telephone communication system is provided which facilitates both private and page communication between stations in the systems as well as function mode communication (i.e., data transmission).

The system includes a plurality of two-wire communication channels. One of these is a calling channel which normally carries FSK (frequency shift keyed) signals which are used to establish communication between a selected pair of stations in the system. Another is a system paging channel on which a voice signal can be transmitted to loud-speakers at each station in the system. Additionally, the system paging channel can, if necessary, carry the FSK calling signals. When the paging channel functions in this manner, it acts not only as the paging channel but also as the system calling channel. The remainder of the channels are normally used for private two-way voice communication; however any one of the private channels can also be designated as the calling channel and carry the FSK calling signals.

The system does not employ a central processor. Rather, each station is provided with a microprocessor which controls all functions of that station and interprets FSK signals from other stations in the system.

One feature of the invention resides in the use of means for impressing a direct current bias voltage on a two-wire communication channel interconnecting two stations in the system. When a call is initiated at a station, a check is made by its microprocessor to determine which channels are unused by determining those channels which are free of a direct current bias. After the microprocessor at a calling station determines that a channel is clear, it transmits on the calling channel an FSK binary signal identifying the station to be called as well as the channel which is to be used for communication between the two stations.

Another feature of the invention is the provision of means for causing the called station to retransmit to the calling station, on the private channel designated by the calling station, an FSK signal indicating that the called station has received the call and is in communication with the calling station. Otherwise, and if the FSK signal is not retransmitted, it is an indication that the called station is not available and the calling station handset receiver produces a busy tone.

A further feature of the invention is the provision of a special page switch at each station which functions as a means to establish page communication between that station and all other stations in the system. For those phones not in private conversations, the page is heard over a loud-speaker. However, for those phones engaged in private conversation, the page message is mixed with any audio signal on a private channel and is heard at the handset receiver. The calling phone asserts a page by suspending microprocessor activity and manually selecting the page mode. The page mode is important, for example, during emergency conditions where alerts must be broadcast systemwide.

Other features include provision for generating and sending an emergency tone from any station in the system, provision for data transfer, an automatic check of the integrity of every station in the system from a dispatcher station, and an installation aid residing in the memory of each phone to aid in proper connection of that phone to the system cables.

The above and other objects and features of the invention will become apparent from the following detailed description taken in connection with the accompanying drawings which form a part of this specification, and in which.

Figure 1:
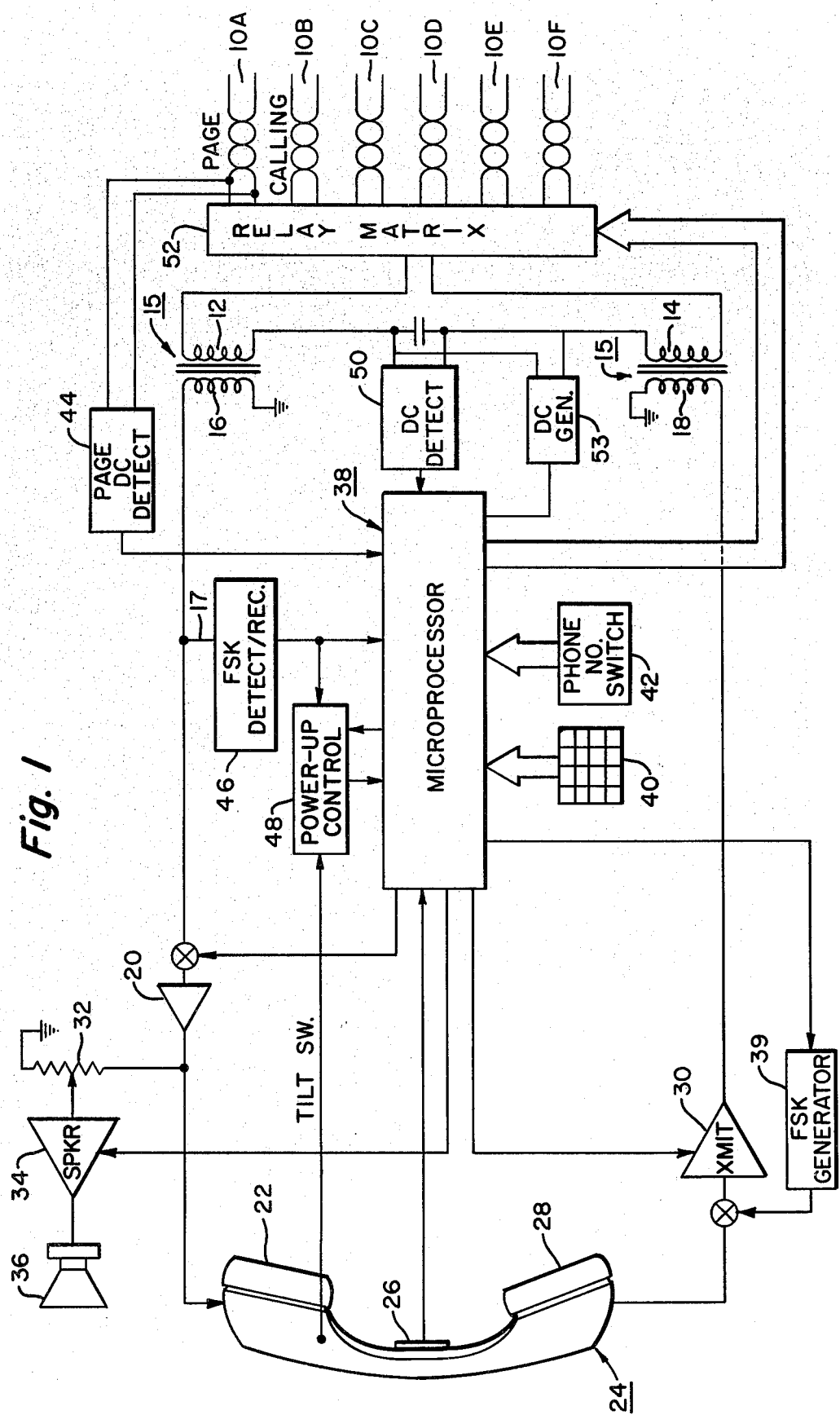
FIG. 1 is a simplified block diagram of the telephone system of the invention.

With reference now to the drawings, and particularly to FIG. 1, there is shown a station utilized in the telephone communication system of the invention. Each station is adapted to transmit or receive signals on six two-wire communication channels identified by the reference numerals 10A through 10F. These are connected to a relay matrix 52 adapted to connect a selected one of the channels to primary windings 12 and 14 on a hybrid transformer 15 shown in two parts for purposes of simplicity. The hybrid transformer 15 is provided with two secondary windings 16 and 18. Winding 16 is connected through amplifier 20 to the earphone 22 of a telephone handset 24 provided with a push-to-talk switch 26. The microphone 28 of the handset 24 is connected through amplifier 30 to the winding 18 on the hybrid transformer.

The amplifier 20 is also adapted to be connected through volume control potentiometer 32 and speaker amplifier 34 to a loud-speaker 36 used for page communication. That is, when the speaker amplifier 34 is activated, page signals are broadcast from the speaker 36, usually at every station in the system. The speaker amplifier 34 is activated by a microprocessor 38 which controls all functions of the station except general page, as will hereinafter be described in greater detail. Connected to the microprocessor 38 is a key pad pushbutton panel 40 by which the telephone number of a station to be called is selected as well as other control functions to be described. Microprocessor 38 is also connected to a phone number switch 42 which identifies the telephone of the station shown in FIG. 1, for example. Alternatively, the telephone can be identified by a number permanently stored in the memory of the microprocessor.

The communication line 10A is used to trasmit page signals. The system is such that whenever one of the communication channels 10A through 10F is in use, a direct current bias will be impressed thereon. The direct current bias on page channel 10A is detected by a page direct current detector 44 which will activate the audio amplifiers 20 and 34 such that they will be turned ON when a page signal is being transmitted, unless the station is already in private communication.

One of the relays in relay matrix 52 is normally closed while all others are normally open. When no control signals are present on the lines connecting microprocessor 38 with relay matrix 52, this normally-closed relay connects one of the lines 10A through 10F to the primary of the hybrid transformer 15. The line which is connected to this normally-closed relay is designated the "calling channel" of the system. Assume, for simplicity, that line 10B is the calling channel. In this case, the relay associated with line 10B in all telephones is the normally-closed relay. To initiate a call, FSK signals are transmitted over this calling channel from the calling station to all other stations not already in private communication. An FSK detector and receiver 46 in each called station is connected through lead 17, transformer 15 and the normally-closed relay in matrix 52 to the calling channel 10B. This circuit detects the frequency shift keyed (FSK) signals on the calling channel 10B and transmits the resulting digital information to the microprocessor 38. Concurrently, whenever an FSK signal is received, indicating that another station is attempting to call the station shown in FIG. 1, for example, a power-up control circuit 48 applies power to the microprocessor 38 as well as to the handset 24 and other circuit components. Tones such as busy signals and dial tones are applied from microprocessor 38 through the amplifier 20 to the earphone 22. FSK signals transmitted by the station are generated by generator 39, which is controlled by the microprocessor 38, for amplification by amplifier 30.

A direct current detector 50 is connected between the primary windings 12 and 14 of the hybrid transformer and is adapted to detect the existence of a direct current voltage on any one of the communication channels 10B through 10F. As will be seen, the relay matrix 52 is activated by microprocessor 38 to scan all of the channels to determine which ones are in use (i.e., have direct current biases thereon). The microprocessor, after scanning the relays, then selects an unused communication channel and stores the position of that channel in its memory. An FSK signal identifying a called station and the selected, unused channel is then transmitted from the sending station on the calling station. The calling station then applies a direct current bias, derived from DC generator 53, to the selected, unused channel. For purposes of explanation, it will be assumed that the selected channel is channel 10E; however any channel other than page channel 10A can be selected. The calling phone has now claimed the channel and waits for a response. Unless the called station is busy or disabled, it retransmits an echo of the transmitted FSK signal on the selected private channel (in this example, 10E); whereupon a ring tone is generated in the speaker of the called station and in the earpiece of the calling station. If the called station is not free, or if there are no unused channels available at this time, a busy tone is heard in the earpiece of the calling phone.

Figure 2:
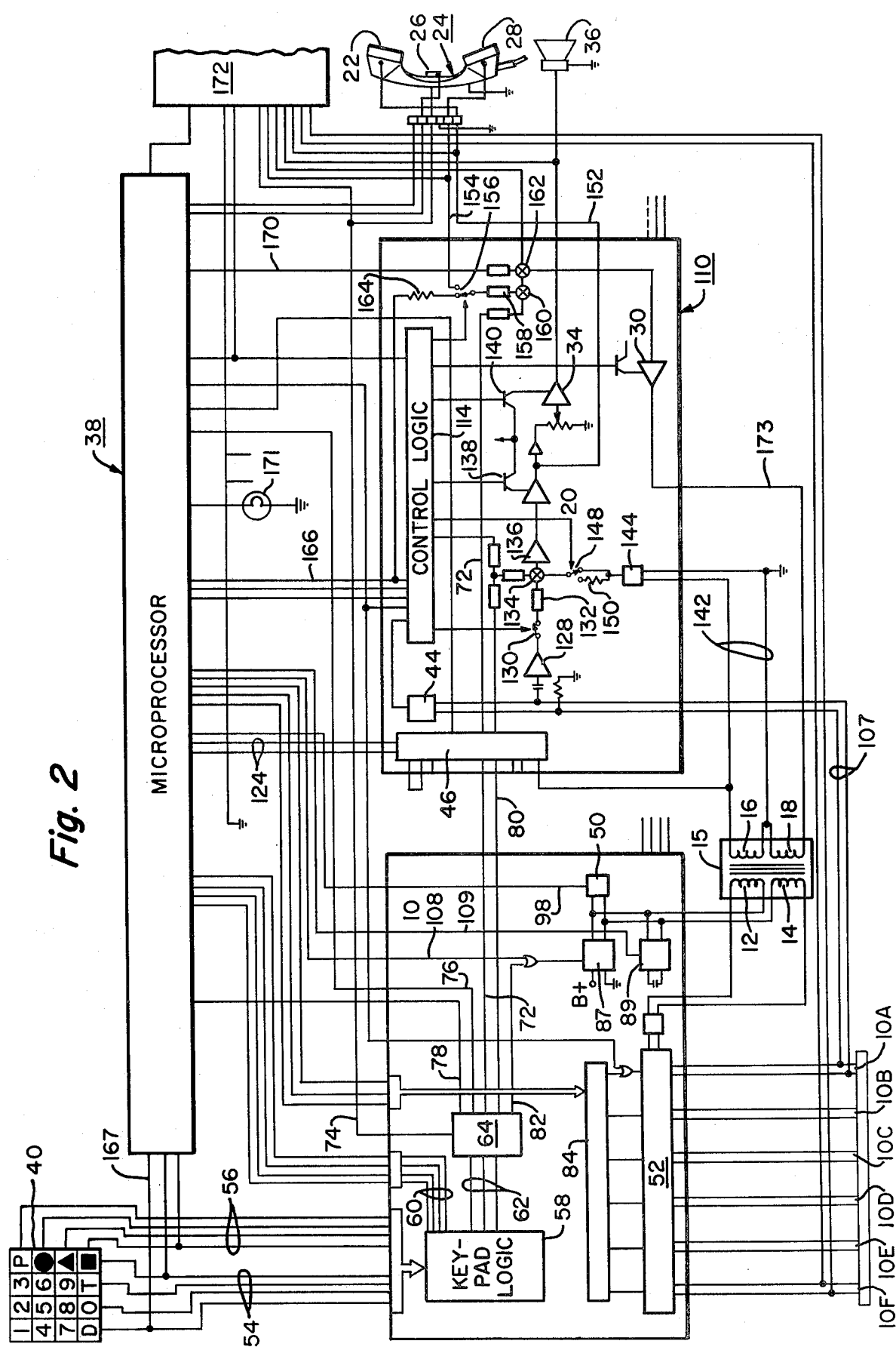
FIG. 2 is a more detailed block and schematic diagram of a station in the communication system of the invention.
Figure 3:
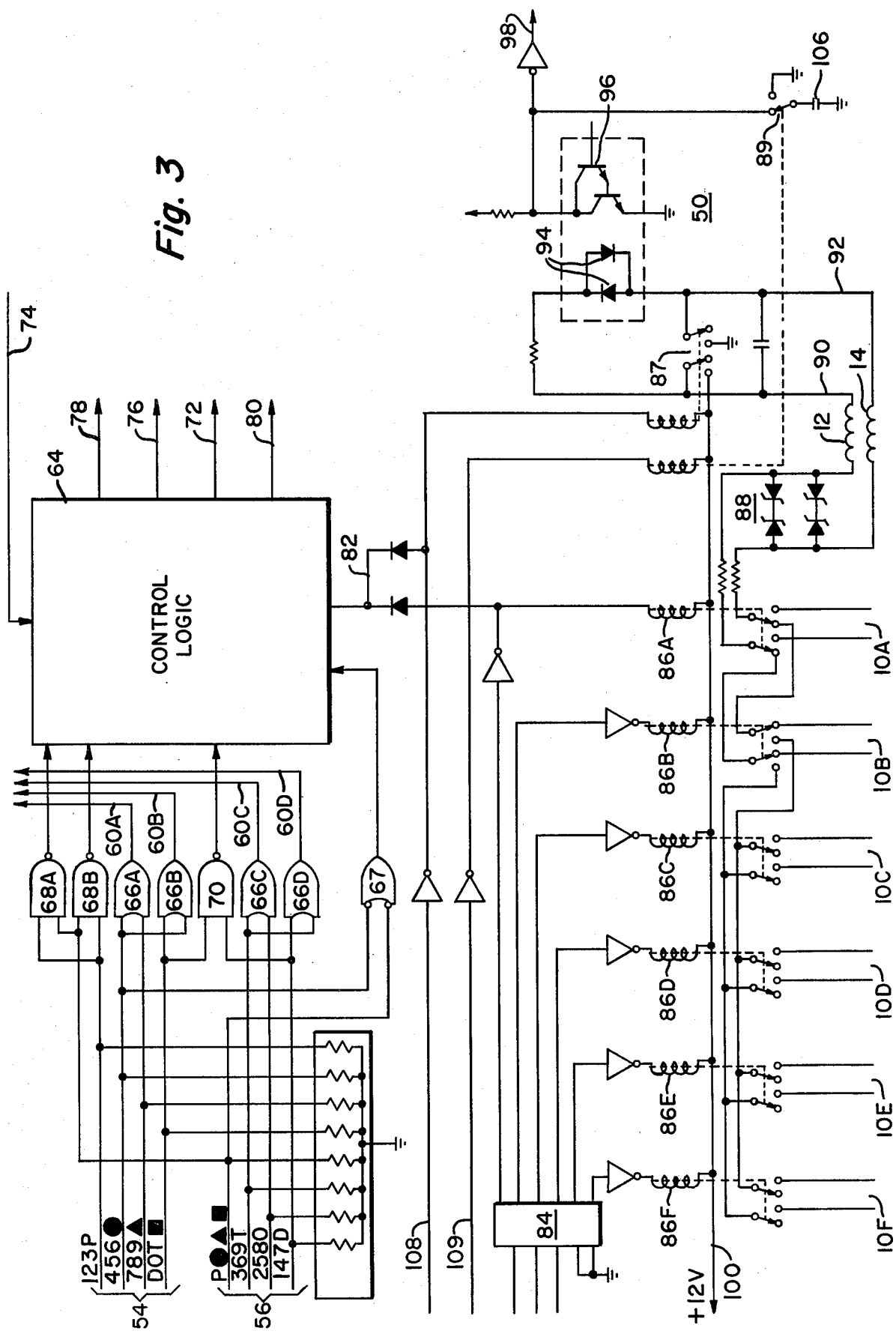
FIG. 3 is a schematic diagram of the keyboard decoder logic, the relay decoder/driver and the relay switching matrix utilized in the circuitry of FIG. 2.

With reference now to FIGS. 2 and 3, elements in these figures corresponding to those of FIG. 1 are identified by like reference numerals. The key pad 40 is shown in the upper lefthand corner of FIG. 2 and comprises sixteen pushbuttons arranged in a four-by-four matrix. It includes ten pushbuttons from which a desired two-digit telephone number may be selected. Six other pushbuttons perform other functions which will be described in detail as the description proceeds.

When a pushbutton is depressed in one of the four vertical columns of the key pad 40, a corresponding signal will be generated on one of four output leads 54. The same pushbutton also causes a signal to be generated on one of four leads 56 according to its position in the horizontal rows. The leads 54 and 56 are connected to a keyboard decoder logic circuit 58 having four output leads 60 connected to the microprocessor 38 and three output leads 62 connected to a control logic circuit 64. (See also FIG. 3). Those signals on lead 60 are applied to the microprocessor 38 to identify a station being called.

The details of the decoder logic circuit 58 and control logic circuit 64 are shown in FIG. 3 where the leads 60 are identified as 60A through 60D. These leads, it will be noted, are connected to the outputs of four NOR circuits 66A, 66B, 66C and 66D. The pushbuttons to which the leads 54 and 56 are connected are identified in FIG. 3. It will be noted that only the three bottom leads in the group 56 are connected to selected inputs of the NOR circuits 66A–66D. Similarly, the three bottom leads of the group 54 are connected to selected inputs of the NOR circuits 66A–66D. With this arrangement, depression of any pushbutton will produce a sequence of signals on the leads 60A–60D identifying the pushbutton which has been depressed. For example, when pushbutton No. 1 is depressed, a signal will appear on lead 60D only. When pushbutton No. 2 is depressed, signals will appear on both of the leads 60C and 60D; when pushbutton No. 4 is depressed, signals will appear on leads 60A, 60B and 60D; and so on. Thus, each pushbutton depression will produce a discrete set of ON and OFF signals on the leads 60A–60D which are recognized by the microprocessor 38 as a digit in a telephone number. The functions of the remaining pushbuttons will be described later.

Depression of the page or "P" key is sensed by two AND circuits 68A and 68B. Similarly, depression of the "D" key will produce an output from AND circuit 70. These outputs are applied to the control logic module 64, also shown in FIG. 2. When both the "P" and "D" pushbuttons are depressed, the outputs of AND circuits 68B and 70 will trigger an oscillator in module 64 to produce an emergency tone signal on lead 72 which is transmitted from the station in a manner which will be described. This mode of operation may be useful in a mine environment, for example, when an injured miner may not be able to speak.

Also connected to the control logic module 64 is a signal on lead 74 derived from an internal mercury switch in the handset 24. (See also FIG. 2). The standard position for the handset during telephone inactivity is in the cradle with the earpiece and mouthpiece facing downwardly. When the handset is lifted, however, a signal will be produced on lead 74 and is applied to the control logic circuit 64 which sends a signal via lead 76 to the microprocessor 38 to power-up the phone system due to handset elevation. Other ways in which the station can be powered-up include (1) reception of an FSK signal from another station, (2) detection of an external event (e.g., fire), and (3) assertion of control by an optional databoard. When the handset is replaced on the cradle, and after a predetermined time delay, a signal is produced on lead 78 which is applied to the microprocessor 38 to indicate that a conversation has terminated.

The control logic circuit 64 also produces a tilt tone signal on lead 80 whenever the handset is accidentally being held in a position which will be interpreted as a signal to the microprocessor 38 that a conversation has been terminated. That is, if the operator, during a telephone conversation, accidentally places the handset in a position whih simulates the normal position it is in on the cradle, a tilt signal will be produced on lead 80 which will produce an audible tone signaling the operator that the condition should be corrected. It is for this reason that the microprocessor disable signal on lead 78 is delayed. That is, sufficient time is given while the tilt tone signal persists before a signal appears on lead 78 to enable the operator to correct mispositioning of the handset.

If, during a general page, it is desired to establish party-line communication with all stations, the " " pushbutton is depressed. This causes OR circuit 66A to produce a signal which causes the microprocessor to select the page channel 10A via relay matrix 52 and to activate the audio transmitter amplifier 30 and the handset 24.

The relay matrix 52 includes six relays identified in FIG. 3 as 86A through 86F. Relay 86A is adapted to connect the station to the page line 10A; while relays 86B–86F are adapted to connect the station to a selected private communication channel 10B through 10F, respectively. Relay 86B is a normally-closed relay connecting the unit to the channel 10B. Whenever the "P" pushbutton is depressed on key pad 40, a signal will appear on lead 82 at the output of control logic module 64 which energizes relay 86A, thereby connecting the station to the page line 10A.

To determine whether a channel is free for an incoming call, microprocessor 38 connects that channel through relay matrix 52 to one side of current/voltage limiter 88, consisting of series-connected Zener diodes. The other side of the limiter 88 is connected through the primary windings 12 and 14 of the aforesaid transformer 15 and leads 90 and 92 to the DC detector 50, also shown in FIG. 1. During this time, the contacts of relay switch 87 are in the positions shown in FIG. 3. A direct current voltage derived from one of the communication channels and appearing across leads 90 and 92 will energize light-emitting diodes 94. These diodes generate light which triggers light-sensitive transistor 96 to produce an output signal on lead 98 indicating the existence of a direct current bias on a communication channel to which the station has been connected. This signal is applied to the microprocessor. In this respect, it will be appreciated that once one of the relays 86C through 86F, respectively, is energized such that its contacts close, a direct current bias across the two leads of the communication channel will energize the light-emitting diodes 94 to indicate the existence of the direct current bias. A similar sequence occurs with relay 86B except that it must be deenergized to close its contacts.

In order to claim and hold a channel for an outgoing call at a calling station, relay 87 is energized to reverse the positions of its contacts shown in FIG. 3. Under these circumstances, lead 90 will be grounded and lead 92 will be connected to a +12 volt source through lead 100 such that a direct current bias will be impressed across the leads of a selected private communication channel for an outgoing call.

The switch 89 shown in FIG. 3 is energized when the microprocessor 38 scans for direct current signals on the leads 10B through 10F in response to an FSK signal indicating that that particular station is being called. That is, when switch 89 is energized, it effectively removes filter capacitor 106 from the circuit which permits the system to respond very rapidly to changes in direct current bias. However, once communication has been established between two stations, the switch 89 again becomes deenergized so that the direct current detector 50 will not respond to transient changes in voltage. Note that the switches 87 and 89 are connected to the microprocessor through leads 108 and 109 and are controlled by the microprocessor.

Reverting again to FIG. 2, page signals on channel 10A are applied via leads 107 to a transmitter-receiver module 110. Superimposed on any page signal is a direct current bias as explained above. This direct current bias is detected by the direct current detector 44, also shown in FIG. 1, the output of the detector 44 being applied to a control logic module 114 to apprise the system that a page signal is being received. The FSK signals are coupled by transformer 15 to the FSK receiver/detector 46, the output of the receiver/detector being applied through leads 124 to the miroprocessor 38.

The page signal on leads 107 is amplified in page preamplifier 128 and passes through switch 130 (which is closed by the logic unit 114 when a direct current signal is detected by detector 44) and through filter 132 to a summation point 134. From summation point 134, the page signal passes through amplifier 136, amplifiers 20 and 34, also shown in FIG. 1, to the loudspeaker 36. During this time, switching transistors 138 and 140, controlled by the logic unit 114, turn ON both of the amplifiers 20 and 34 unless the receiving phone is in private conversation. In this case, amplifier 34 is not turned ON and the page message will be combined with the private message in the earpiece of the handset 24.

Private audio conversation signals pass into the transmitter-receiver module from winding 16 on the hybrid transformer via leads 142. These pass through limiter 144 and switch 148, controlled by logic circuit 114, to the summing point 134. When switch 148, under the control of logic circuit 114, is switched to its position other than that shown in FIG. 2, resistor 150 is switched into the circuit to decrease the sensitivity of the amplifier 136. During reception of a private conversation, only amplifier 20 is enabled by transistor switch 138 while amplifier 34 is not. Consequently, the private conversation signal passes through amplifier 20 and lead 152 to earphone 22 in the handset 24.

Transmitted signals pass from the microphone 28 in handset 24 through lead 154, switch 156 and filter 158 to summing points 160 ansd 162. From summing point 162, they pass through transmitter amplifier 30, controlled from logic unit 114 by switch 163, to winding 18 on the hybrid transformer.

The switch 156 is connected by logic unit 114 and in the position shown is connected through resistor 164 to lead 166 connected to the output of the microprocessor 38. On this lead appears various tones. These include a dial tone, a ring tone, beeps (to indicate key pad depressions) and busy signals. The microprocessor controls the switch 156 to thus supply these tones to the winding 18 on the hybrid transformer prior to the time that voice communication is established. Also connected to the summing points 160 and 162 is the emergency tone on lead 72 derived from control logic module 64.

OPERATION OF THE SYSTEM

In order to establish private communication between two stations in the system, the operator at the calling station will pick up the handset 24, at which time he will hear a dial tone from the earphone 22. That is, the microprocessor 38 is powered-up and apprised of the fact that the receiver has been lifted by virtue of the signal on lead 74 which passes through control logic unit 64 and lead 76 to the microprocessor. At the same time, a battery, not shown, is connected to the various circuit components at the station. When the operator hears the dial tone from earphone 22, he will enter a two-digit number on the key pad 40. After the two-digit number is entered, the microprocessor 38, through decoder 84, causes the relays 86B through 86F to close in sequence to determine those private communication lines which have a direct current bias thereon and, therefore, are not available since they are already in use. This is achieved with the use of the DC detector 50 as explained above. If none of the communication channels are available, the microprocessor 38 will generate a busy signal which is heard at the earphone 22. Assuming, however, that at least one channel is free, the microprocessor 38, through its internal memory, stores the location of the free line. The microprocessor 38 then applies an FSK signal on lead 170 to the transmitter amplifier 30 which, in turn, impresses it on lead 173 and, via the transformer 15, on calling channel 10B. It makes no difference whether the calling channel 10B is being used for private conversation at that time since the audio frequency signals are widely displaced in frequency from the FSK signals. However, if it is determined by the FSK receiver 46 that FSK signals are already on the calling channel, the microprocessor at a calling station will delay sending its FSK signal until the calling channel is clear. In this respect, two FSK signals cannot be transmitted at the same time. Typically, the basic data rate of the FSK signal is 400 bits per second at two FSK frequencies centered about 20 KHz. Each FSK transmission format includes the following data:

1. An 8-bit address field which includes the two binary-coded digit number of the phone being called.
2. A 1-bit designator field which is either "1" for a function message or "0" for a conversation initiation message.
3. A 4-bit message which consists of either the function value in the function transmission mode or the speaking channel number in the conversation initiation message.

This FSK transmission is received by every station in the system not currently in private conversation. The FSK signal is transmitted in plural iterations from the calling station to insure noninterference and reception.

After several iterations, the calling station waits for a response from the called station on the prearranged private channel. If it is free, the called station hears the FSK message; and its microprocessor 38 energizes the appropriate relay 86B through 86F to connect it to the channel on which it is being called. Within 430 milliseconds, the called station then transmits an echo of the same FSK message it received. In this way, the calling station recognizes that it is in communication with the called station on the private channel and it energizes the appropriate relay in matrix 52 while energizing relay switch 87 to apply a DC bias to the selected calling channel. If the FSK signal is not retransmitted by the called station, the calling station is apprised of the fact that the called station is not available and its microprocessor 38 generates a busy signal which is heard at the earphone 22.

Assuming, however, that the called station is free and that the FSK message from the calling station is retransmitted, the microprocessor 38 at the called station generates a ring tone which is transmitted on the private channel and is heard at the earphone 22 of the calling station. This ring tone will persist until the handset is elevated at the called station, whereupon the microprocessor at the called station terminates the ring tone. At this point, voice communication is established between the two stations in the system.

If it is desired to initiate a page, the "P" pushbutton on key pad 40 will be depressed at a calling station whereby relay 86A and switch 87 at the calling station will be energized. Audio signals from the handset microphone 28 are now impressed on the page channel 10A and are heard at every station in the system via loud-speaker 36 except at those stations between which private conversations are being held. For those stations, the page is heard through the earpiece 22 of handset 24. As was explained above, if it is desired to convert a page signal into a party-line communication, the " ● " pushbutton is depressed at the sending station. The microprocessor 38 can be reset by depressing the "D" pushbutton (lead 167) to obtain a dial tone at any time. If it is desired to page a single station rather than the whole system, the two digits of that station are depressed followed by depression of the " ▲ " pushbutton after the ring tone is heard.

If, after communication is established between two stations, it is desired to establish a conference call with still a third station, the " ▲ " pushbutton is depressed at the called station. The called station then depresses the pushbuttons at that station identifying the third station to be included in the conference call and communication is established in the manner described above with respect to two stations. The called station must initiate the conference call to insure that direct current is maintained on the line during the time that the third station is being called. A larger number of stations can be included in the conference call in the same way. That is, any one of the called stations (as contrasted with the initial calling station) can depress the " ▲ " pushbutton and two digits identifying an additional station to be called. If it is desired to terminate the conference call, the " ● " pushbutton is depressed after " ▲ " at the first station called.

The system usually includes a dispatcher station which has preemption capability over all other stations in the system. Should the dispatcher wish to interrupt any conversation, a microprocessor 38 at the dispatcher station will generate an FSK signal which will be transmitted on the private channel in use by the station to be preempted. Reception of such an FSK signal will preempt any other private conversation such that the dispatcher can communicate with every station in the system.

On the panel of each remote telephone is a flashing lamp 171 (FIG. 2). This lamp is activated by depression of selected pushbuttons at the dispatcher station and a resultant FSK signal indicating that a response is requested by the dispatcher. Additionally, the lamp 171 will be energized upon a low-battery condition. Once activated, the lamp will continue flashing until the remote telephone establishes communication with the dispatcher, except when actuated by a low-battery level. The lamp 171 can be reset by depressing the " ■ " pushbutton on key pad 40 via leads 169 connected to the microprocessor 38.

Each remote telephone can include four output lines to be interfaced by the user to appropriate devices to be controlled by the dispatcher station. The dispatcher may transmit a control message to any remote site equipped with this option by entering the appropriate key sequence (e.g., depression of the "T" digit) followed by the two-digit phone number of the remote telephone being addressed. Upon successful reception of the control transmission, the remote phone will echo verification of reception. Upon reception by the dispatcher station of this verification, the dispatcher telephone will signal the dispatcher of the verification by three beeps before returning to a new dial tone. This is part of the program for the microprocessor at the dispatcher station. If verification is not received by the dispatcher phone, a busy signal will be generated followed by a new dial tone.

The preemption function allows the dispatcher to suspend conversation at an addressed remote telephone and place the remote telephone in function reception mode until a successful function reception from the dispatcher is achieved. This permits an override by the dispatcher over any remote telephone in the event of an emergency requirement to set a control line.

Each remote telephone may be optionally equipped with an independent intelligent data acquisition card 172 (FIG. 2) which facilitates accumulation of data while the telephone is inactive and transmission of this data, using remote telephone facilities, to a data collection telephone.

In addition, the microprocessor at the dispatcher station is programmed to test the integrity (i.e., operability) of every other station in the system. After a suitablwe keyboard entry at the dispatcher station, each remote station can be called in sequence by entering its telephone number. The dispatcher station calls each remote station on each line and expects a response on each line. If the dispatcher station receives all responses on the respective lines, it is known that the remote station is operable on all lines.

The microprocessor at each station is also programmed for a self-testing function. This is initiated by depressing a sequence of pushbuttons on the key pad 40. For example, the sequence TT193 can be used to initiate the self-testing feature. Thereafter, the "1" pushbutton is depressed and a manual check is made with a voltmeter to determine if a voltage exists across leads 10A. The sequence proceeds with the "2", "3", etc. buttons being depressed in sequence followed by a test for voltage across leads 10B, 10C, etc. In this manner, the operability of each channel at each station can be determined readily.

Programming of the various microprocessors to achieve their logical functions is well within the skill of the art.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a telephone communication system of the type wherein a plurality of stations are adapted to communicate over any one of a plurality of conductors connected to each of the stations without the need for a central switching and control station, the combination of means at each of said stations for establishing communication between it and another station in the system over a selected one of said conductors, and means at each station for impressing a direct current bias on a conductor through which it has established communication with another station such that all other stations in the system will be apprised that a particular conductor interconnecting two stations is in use.

2. The telephone system of claim 1 including means at each of said stations for scanning said plurality of conductors to determine which conductors have a direct current bias thereon, and means, actuable when it is desired to establish communication with another station, for connecting a station to a conductor which does not have a direct current bias thereon.

3. The telephone system of claim 1 wherein each of said conductors comprises a twisted-pair cable.

4. The telephone system of claim 1 including a microprocessor at each of said stations for controlling said means for establishing communication and said means for impressing a direct current bias.

5. The telephone system of claim 4 including a relay matrix under the control of said microprocessor for connecting a selected conductor to said station, said matrix including a plurality of relays each of which is adapted to connect an associated one of said conductors to said station.

6. The telephone system of claim 5 wherein said microprocessor actuates the relays in said matrix to connect each conductor to a station in sequence.

7. The telephone system of claim 5 including means for detecting a direct current bias on any conductor when said relay matrix connects the conductor to said station.

8. The telephone system of claim 4 including means at said station for transmitting a frequency shift keyed signal from that station identifying a station to be called in the communication system.

9. The telephone system of claim 8 including means at each station in the system for detecting said frequency shift keyed signal, and wherein said microprocessor determines whether said frequency shift keyed signal identifies it as a station being called.

10. The telephone system of claim 1 wherein communication between stations is by unmodulated audio frequency signals.

11. The telephone system of claim 10 wherein at least one of said conductors simultaneously carries frequency shift keyed signals as well as audio frequency signals.

12. In a telephone communication system of the type wherein a plurality of stations are adapted to communicate over any one of a plurality of conductors connected to each of the stations without the need for a central switching and control station, the combination of means at each of said stations for transmitting over one of said conductors a digital signal to all other stations in the system, said digital signal identifying a station to be called and a selected conductor on which it is being called, and means at the station being called for connecting that station to said selected conductor.

13. The telephone system of claim 12 wherein said digital signal comprises a frequency shift keyed signal.

14. The telephone system of claim 12 including means at each station for retransmitting to a calling station an echo of said digital signal.

15. The telephone system of claim 12 wherein each of said stations includes a loud-speaker, and including a page conductor in said plurality of conductors for carrying page audio signals from any station to the loudspeakers of all stations in the system.

16. The telephone system of claim 12 including means, operable after the station being called is connected to said selected conductor, for transmitting digital data on said selected conductor derived from devices separate from but connected to a calling station.

17. The telephone system of claim 16 including means at the calling station for accessing, storing and formulating digital data derived from said separate devices.

18. In a telephone communication system of the type wherein a plurality of stations are adapted to communicate over any one of a plurality of conductors connected to each of the stations without the need for a central switching and control station, the combination of means at each of said stations for establishing communication between it and another station in the system over a selected one of said conductors, a dispatcher station in said system, and means including a microprocessor at said dispatcher station for checking the integrity of every other station in the system.

19. The telephone system of claim 18 including a microprocessor at each station in the system, and means for transmitting frequency shift keyed signals from the dispatcher station to every other station in the system to check the integrity of said every other station.

* * * * *